United States Patent [19]
Sanchez et al.

[11] Patent Number: 6,166,586
[45] Date of Patent: Dec. 26, 2000

[54] INTEGRATED CIRCUIT AND METHOD THEREFOR

[75] Inventors: Hector Sanchez, Cedar Park; Ross D. Philip, Houston, both of Tex.; Lakshmikant Mamileti, Denver, Colo.

[73] Assignee: Motorola Inc., Schaumburg, Ill.

[21] Appl. No.: 09/110,371

[22] Filed: Jul. 6, 1998

Related U.S. Application Data

[63] Continuation-in-part of application No. 08/772,710, Dec. 23, 1996, Pat. No. 5,829,879.

[51] Int. Cl.$^7$ ....................................................... G05F 1/10
[52] U.S. Cl. ............................ 327/538; 327/542; 323/315
[58] Field of Search ..................................... 327/530, 538, 327/378, 542, 543; 323/315–317

[56] References Cited

U.S. PATENT DOCUMENTS

| | | | |
|---|---|---|---|
| 5,391,979 | 2/1995 | Kajimoto et al. | 323/313 |
| 5,451,892 | 9/1995 | Bailey | 327/113 |
| 5,581,174 | 12/1996 | Fronen | 323/316 |
| 5,625,281 | 4/1997 | Lambert | 323/315 |
| 5,760,639 | 6/1998 | Hall | 327/539 |

*Primary Examiner*—Kenneth B. Wells

[57] ABSTRACT

A temperature sensor having a process compensated current generator (37) for use in a temperature sensing circuit (35) and a current comparator (40). The current generated in reference current generator (36) provides a complementary distortion to balance the effect introduced by processing into the two circuits which make up temperature dependent current generator (38). The generator generates two currents which are used to measure temperature changes. The generator including both PFET and bipolar devices, where the generator compensates for variations in processing conditions. According to one embodiment, the temperature sensor includes a process compensation generator which provides an indicator as a function of at least one processing parameter and a current generator which adjusts the currents according to the indicator.

5 Claims, 4 Drawing Sheets

INTEGRATED CIRCUIT AND METHOD THEREFOR

RELATED APPLICATIONS

The present application for patent is a continuation-in-part of "Temperature Sensor" by Hector Sanchez, et al. having Application No. 08,772,710, now U.S. Pat. No. 5,829,879 filed on Dec. 23, 1996 and assigned to the assignee hereof, which is herein incorporated by reference.

CO-PENDING RELATED APPLICATIONS

The present patent application is a member of the following group of patent applications related to one another by subject matter: "Data Processor with Circuit for Regulating Instruction Throughput and Method of Operation," by Alexander et al., filed on Dec. 23, 1996 and having Application No. 08,772,713, now U.S. Pat. No. 6,029,006 and "Thermal Management Unit and Method of Operation," to Gerosa et al., filed on Dec. 23, 1996 and having Application No. 08,777,925, all of which are assigned to the assignee hereof.

FIELD OF THE INVENTION

The present invention generally relates to electronic circuits, and more specifically to current generators and circuits for sensing temperature.

BACKGROUND OF THE INVENTION

Current generators are used within an integrated circuit to generate currents for use as reference currents, etc. Typical current generators are used as a constant current source. Many circuits within an integrated circuit require a current, including temperature sensing circuits. Temperature sensors are devices used to detect the temperature of a device that contains the sensor or is physically located near to the sensor. In this way, the operation of a circuit may be controlled as a function of its temperature. Such control may be advantageous in the case of applications that require heat dissipating devices, and for other purposes. For instance, it may be necessary to incorporate a heat sink into an integrated circuit, or to force air over the integrated circuit if the integrated circuit has the potential of ever exceeding the passive cooling ability of the integrated circuit. With a temperature sensor, it may be possible to avoid these instances and, thus, to avoid the requirement of a heat sink, fan, etc. altogether.

Known thermal sensors have traditionally relied on complex discrete solutions. For instance, known thermal sensors incorporate resistors, capacitors, operational amplifiers, and ring oscillators to detect changes in temperature. Unfortunately, these devices may be incompatible with modern, complementary metal oxides semiconductor (CMOS) manufacturing processes. And, these solutions may require complex control circuitry to operate.

Other known solutions are not fully integrated. A fully integrated solution is one in which the sensing element resides on the same integrated circuit whose temperature is of interest. Instead, prior solutions have located a sensing element near to the device of interest. This solution is more expensive and less responsive to temperature changes. These non-integrated solutions are less responsive to temperature changes due to the thermal resistance between the external sensor and the device of interest.

For operation at decreasing operating voltages, methods of generating currents and sensing temperature in integrated ciruits become less effective, as transistor properties degrade with lower supply voltages. Additionally, the electrical effects introduced over the processing window are magnified at lower voltages. It is desirable to generate currents for use at lower voltage levels, where the current is not affected by variations in device parameters and other processing characteristics. It is desirable to generate a current for use in a temperature sensor, which is applicable to lower voltage levels and is sensitive to processing conditions.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

In the following description, numerous specific details are set forth such as specific control register bit lengths, etc. to provide a thorough understanding of the present invention. However, the present invention may be practiced without such specific details. In other instances, circuits have been shown in block diagram as illustrative of functional aspects of the present invention.

According to one aspect of the present invention, a current generator is included in an integrated circuit and includes a means for generating a process compensation indicator, where the process compensation indicator is a function of at least one semiconductor device parameter of the integrated circuit. The current generator further includes a means for generating a biasing voltage, comprising at least one transistor for generating the biasing voltage, a compensation means for adjusting the biasing voltage according to the process compensation indicator, the compensation means coupled between the means for generating a biasing voltage and the means for generating the process compensation indicator, and a means for tranforming the biasing voltage into a current in response to adjusting the biasing voltage. According to one embodiment of the present invention, the process compensation indicator is current.

Figure 1:
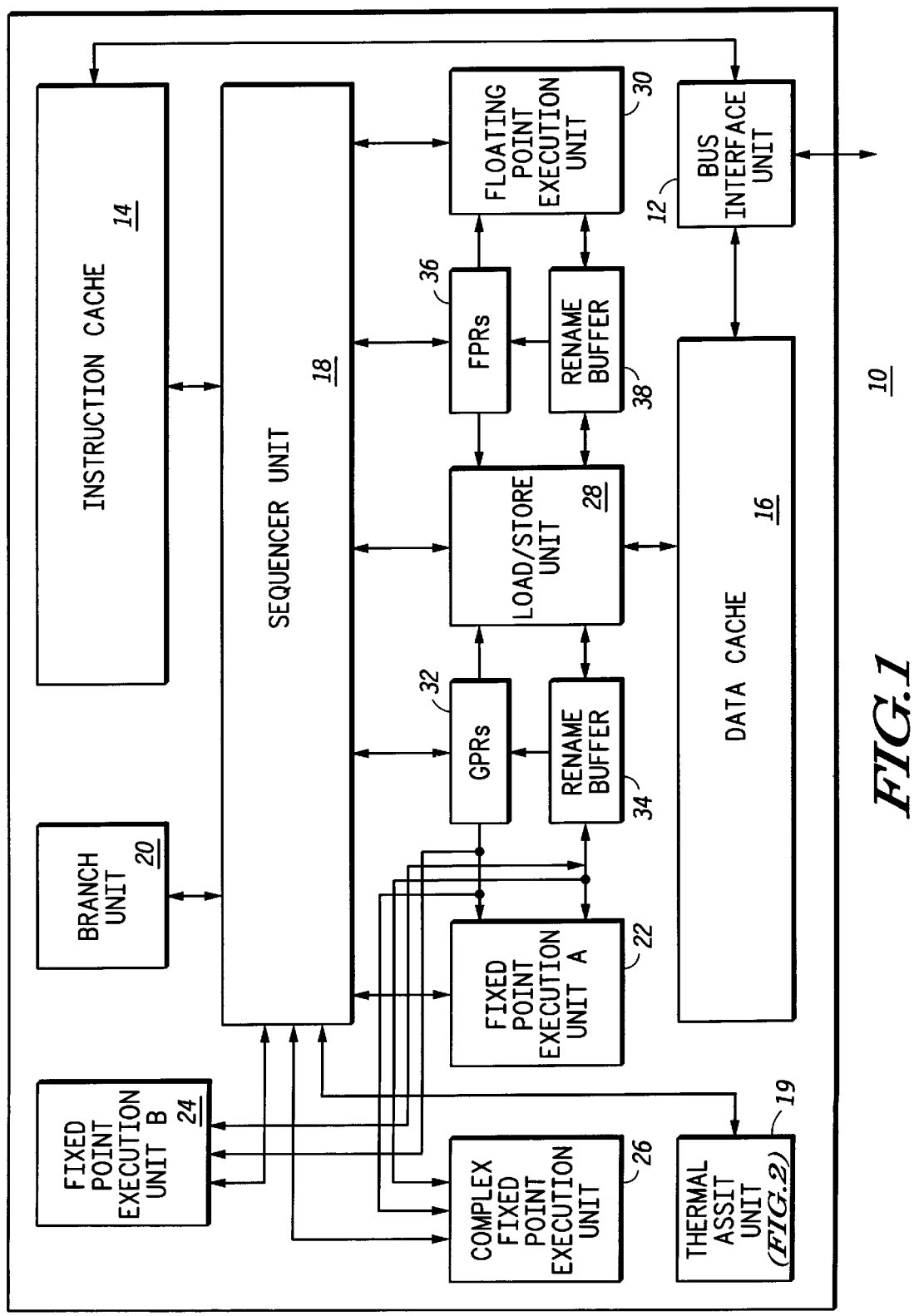
FIG. 1 illustrates, in block diagram form, a data processor constructed in accordance with one embodiment of the present invention.

FIG. 1 depicts a block diagram of a data processor 10 constructed in accordance with the present invention. A bus interface unit 12 controls the flow of data external to data processor 10. Bus interface unit 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a thermal assist unit 19, branch unit 20, a fixed point execution unit A 22, a fixed point execution unit B 24, a complex fixed point execution unit 26, a load/store execution unit 28, and a floating point execution unit 30. Thermal assist unit 19 is more fully described below in connection with FIG. 2.

Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. Floating point execution unit 30 and load/store execution unit 28 read and write their results to a floating point architectural register file 36, (labeled FPRs and hereafter FPR file) and to a second rename buffer 38.

Generally, within the operation of data processor 10, branch unit 20 determines what sequence of programmed instructions is appropriate given the contents of certain data registers and the instructions themselves. Instruction cache 14 provides this sequence of programmed instructions to sequencer 18. If instruction cache 14 does not contain the required instructions, then it may fetch them from external to data processor 10.

Sequencer unit 18 dispatches the individual instructions of the sequence of programmed instructions to the various execution units 19, 20, 22, 24, 26, 28 and 30. Sequencer unit 18 also reserves an entry in either rename buffer 34 or 38 in which to temporarily store the result, if any, of each instruction. Both rename buffers are first-in-first-out ("FIFO") queues.

Each of the execution units performs one or more instructions of a particular class of instructions. The particular class of instructions of each execution unit is indicated by the name of the execution unit. For instance, thermal assist unit 19 executes instructions associated with the sensing of temperature. Fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

Figure 2:
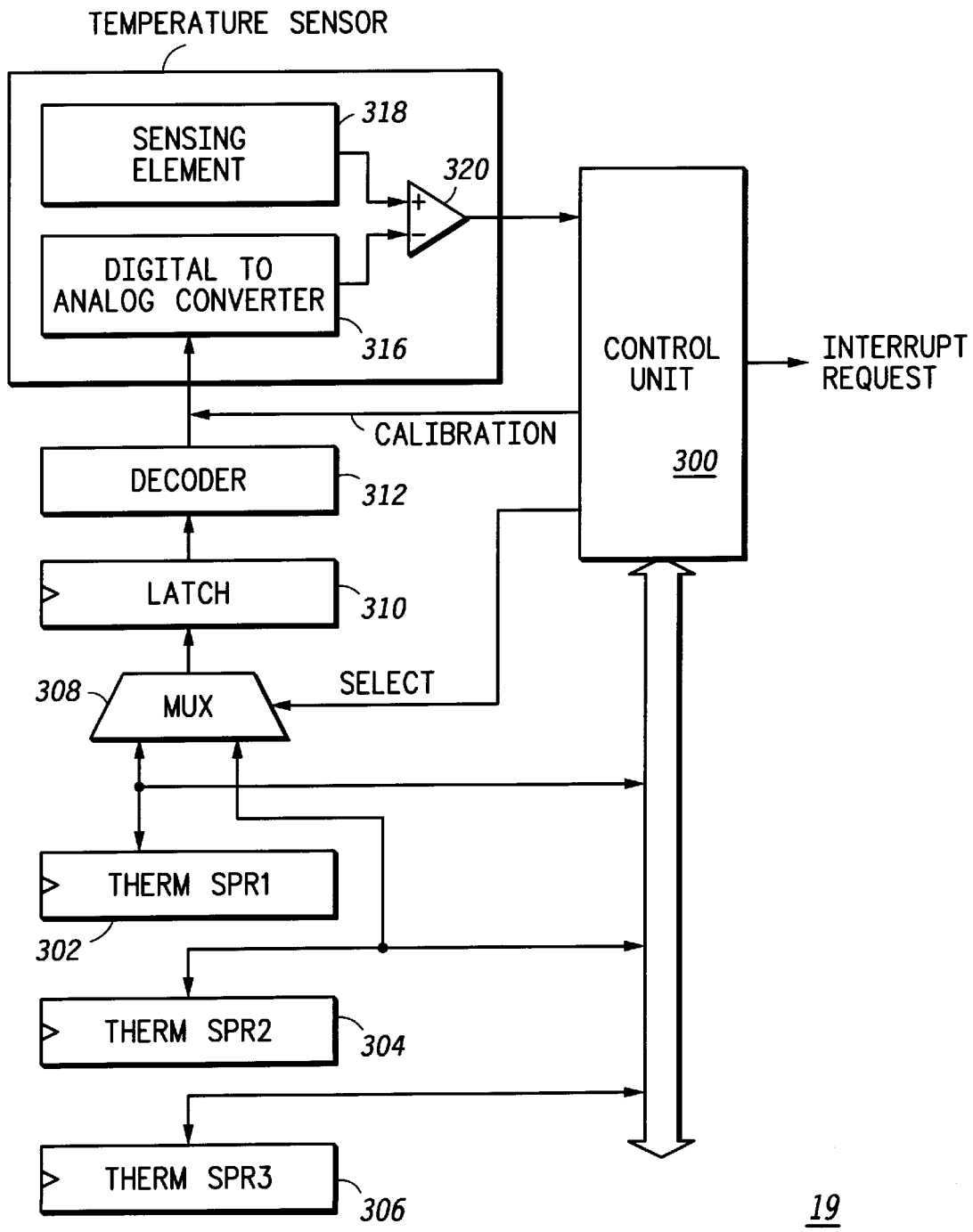
FIG. 2 illustrates, in block diagram form, a thermal assist unit of FIG. 1, according to one embodiment of the present invention.

FIG. 2 illustrates one embodiment of thermal assist unit 19 of FIG. 1. A control unit 300 is coupled to three user programmable registers 302, 304, and 306. Registers 302, 304, and 306 store three control/data values THERM SPR1, THERM SPR2, and THERM SPR3, respectively. (THERM and SPR are abbreviations for thermal and special purpose register, respectively.) THERM SPR1, THERM SPR2, and THERM SPR3 are described below in connection with FIG. 4. An output of register 302 and register 304 are coupled to a first input and to a second input of a 2:1 multiplexer, (MUX) 308. An output of MUX 308 is latched each clock cycle by a latch 310. An output of latch 310 is mapped into a easily usable set of control signals by a decoder 312. An output of decoder 312 is coupled to a temperature sensor 314. An output of temperature sensor is coupled to control unit 300.

Conceptually, temperature sensor 314 contains a digital to analog converter 316, a temperature sensing element 318 and a voltage gain stage 320. Voltage gain stage 320 may be the first stage of an operational amplifier, or may be a sense amplifier, etc. A plus (+) terminal of voltage gain stage 320 receives the output current or voltage from sensing element 318. The particular current or voltage output by sensing element 318 is dependent upon the temperature of data processor 10. A minus (−) terminal of voltage gain stage 320 receives the voltage or current output by digital to analog converter 316. The particular current or voltage output by digital to analog converter 316 is dependent upon the value output by MUX 308. Control unit 300 selects this value. Voltage gain stage 320 indicates a positive voltage level if the current or voltage level output by sensing element 318 is greater than the current or voltage level output by digital to analog converter 316.

In operation, thermal assist unit 19 causes temperature sensor 314 to compare a thresh old value stored in either THERM SPR1 or THERM SPR2against the temperature sensed by sensing element 318. Thermal assist unit 19 can then take one or more steps in response to that comparison. The particular threshold and the one or more steps taken after comparison are determined by the values programmed into THERM SPR1, THERM SPR2, and THERM SPR3. These registers are visible to the user of data processor 10 to control the power and thermal management functions described herein. For example, according to one embodiment THERM SPR1 and THERM SPR2contain the fields V, TIE, TID, TIV, and TIN, which are each single bit fields, and also contain the field THRESHOLD, which is a seven bit field.

V (SPR valid) is a one bit field. When V=1, then the remaining data in the corresponding special purpose register is valid. When V=0, then the remaining data in the corresponding special purpose register is invalid. TIE (thermal interrupt enable) is a one bit field. When TIE=1, then control unit 300 may generate an interrupt under certain circumstance. These circumstances are described below in connection with the TID field. When TIE=0, then control unit 300 will not generate an interrupt. TID (thermal interrupt direction) is a one bit field. When TID=0, then control unit 300 may generate an interrupt if the sensed temperature i s greater than the THRESHOLD temperature. When TID=l, then control unit 300 may generate an interrupt if the sensed temperature is less than the THRESHOLD temperature.

Continuing with the embodiment, THRESHOLD is a seven bit field. The contents of this field are applied to one input of MUX 308 for comparison against the temperature sensed by sensing element 318. TIV (thermal interrupt valid) is a one bit field. Control unit 300 sets this field to 1 to indicate a valid TIN field. TIN (thermal interrupt bit) is a one bit field. Control unit 300 sets this bit after receiving a temperature comparison. The meaning of the contents of this field is determined by the TID field. For instance, if TID=0, and TIN=1, then the sensed temperature was greater the THRESHOLD temperature. Conversely, if TID=1, and TIN=1, then the sensed temperature was less than the THRESHOLD temperature.

As an additional example, according to one embodiment of the present invention, THERM SPR3 contains the fields E, SAMPLE INTERVAL TIMER, 1%, 2%, 4%, 8%, and PLUS/MINUS. E (enable) is a one bit field. When E=1, then control unit 300 may perform a comparison as specified by THERM SPR1, by THERM SPR2, by both registers, or by neither as indicated individually by those registers. When E=0, then control unit 300 will not perform any comparison. SAMPLE INTERVAL TIMER is a thirteen bit field. The contents of this field indicate the number of clock cycles control unit 300 waits before sampling the output of temperature sensor 314 for interrupt generation, TIN setting, etc. 1%, 2%, 4%, 8% (calibrating bits) are each one bit fields. Collectively, they set an offset to sensing element 318 to compensate for the performance variations of sensing element 318 caused by manufacturing or CMOS process variations.

Alternate embodiments may include any number of registers for storing thermal decision making and control information, and each register may contain any number of bits for implementing such decision and control. The example of FIG. 2 is illustrative of the thermal control concept, and the implementation of of a temperature sensor in a data processing system.

Referring still to FIG. 2, according to one embodiment, control unit 300 operates in one of three modes: idle, single threshold comparison, or dual threshold comparison. In the idle state, control unit 300 performs no operations. The idle state is designated by setting THERM SPR3 E=0. It should be understood that control unit 300 will return to this state whenever the user sets THERM SPR3 E=0. In the single threshold comparison mode, control unit 300 applies one of the two THRESHOLD fields to temperature sensor 318. Control unit 300 will continue to make periodic comparisons unless it is programmed to generate an interrupt. If control unit 300 is programmed to generate an interrupt, then it will pause until the interrupt has been cleared by the user through an interrupt routine. In the dual threshold comparison mode, control unit 300 sequentially applies both THRESHOLD fields to temperature sensor 318. Control unit 18 will continue to make periodic comparisons of both thresholds unless it is programmed to generate an interrupt for one or both of the thresholds. If control unit 300 is programmed to generate one or two interrupts, then it will pause making measurements of one or both of the thresholds until the one interrupt or until the two interrupts have been cleared by the user.

One application of TAU 19 is to determine the temperature of data processor 10. The temperature of data processor 10 may be determined using a single special purpose register, slowly incrementing or decrementing the THRESHOLD field until an appropriate interrupt is generated. However, the temperature of data processor 10 may be efficiently determined with two simultaneous temperature comparisons permitted by two special purpose registers.

In general, a window is created using the THRESHOLD fields in THERM SPR1 and THERM SPR2. The temperature of data processor 10 is sensed to determine if it is within that window. The window is then narrowed if the actual temperature is within the window. Conversely, the window is widened if the actual temperature is outside of the window.

Figure 3:
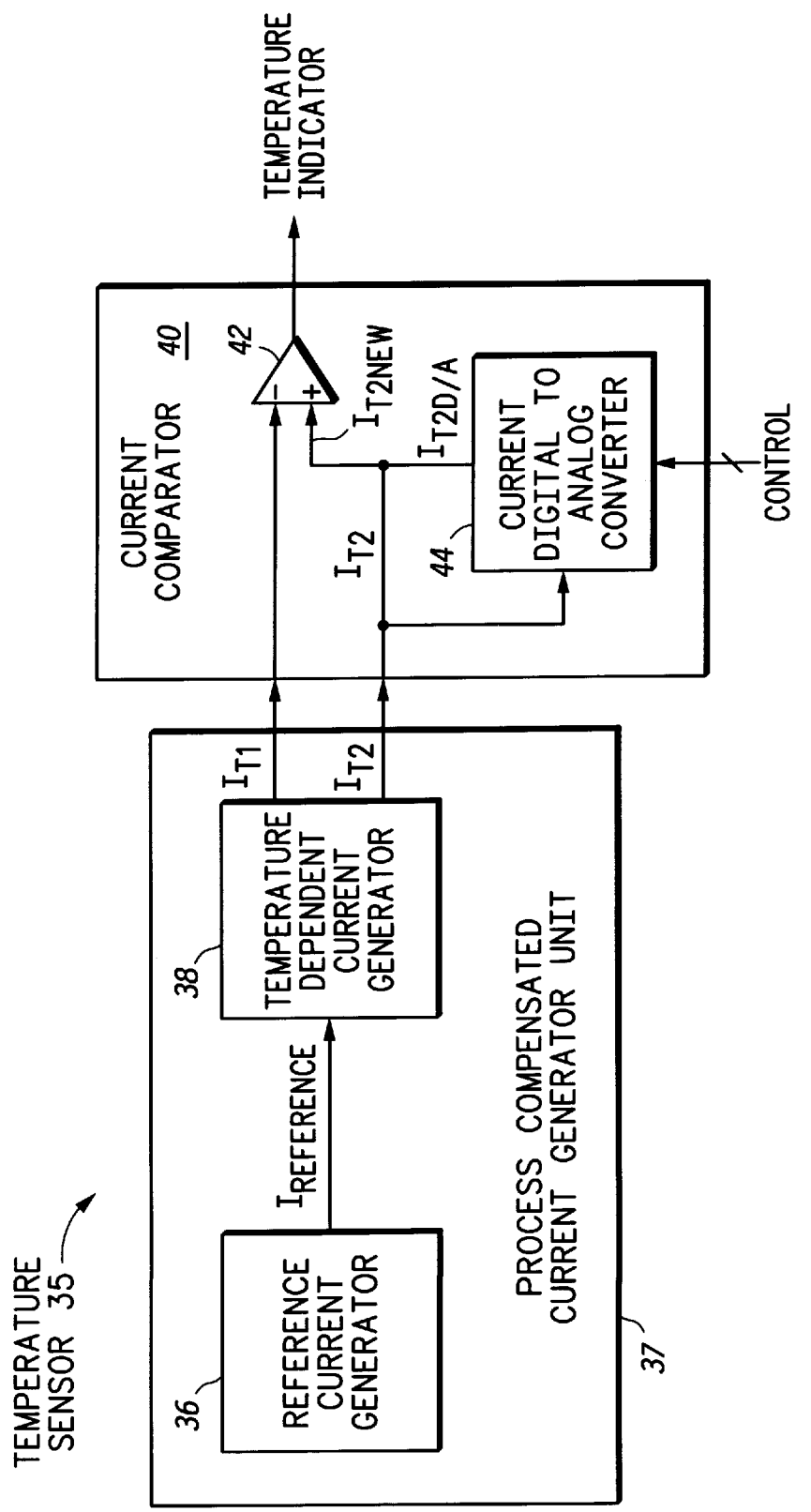
FIG. 3 illustrates, in block diagram form, a temperature sensor as depicted in FIG. 1, according to one embodiment of the present invention.

FIG. 3 illustrates in block diagram form, a temperature sensor 35, similar to temperature sensor 314 of FIG. 2, according to an alternate embodiment of the present invention. Temperature sensor 35 is provided within a thermal assist unit, such as thermal assist unit 19 of FIG. 1, in a manner similar to temperature sensor 314 of FIG. 2. Temperature sensor 35 includes process compensated current generator unit 37 and current comparator 40. Within unit 37, reference current generator 36 generates a reference current $I_{REFERENCE}$ to temperature dependent current generator 36. In response to the reference current, temperature dependent current generator 38 generates two currents to current comparator 40. The two currents are labeled $I_{T1}$ and $I_{T2}$, and a comparison of the currents provides an indication of temperature changes within the data processing system. The currents are generated using proportionally scaled circuits, where the difference between the two currents is a function of the temperature of temperature dependent current generator 38.

Current comparator 40 compares the two currents and provides a temperature indicator to a control unit, such as control unit 300 of FIG. 2. The control unit then determines if the temperature of the data processing system violates a predetermined user defined value and takes actions accordingly. Current comparator 40 includes an amplifier 42, which provides the output of the temperature indicator. Amplifier 42 has a positive and a negative input. The first current, $I_{T1}$, is provided to the negative input to the amplifier. The second current, $I_{T2}$, is provided to a current digital to analog converter 44 within current comparator 40. The current digital to analog converter 44 receives a control signal from within the data processing system, which initiates a conversion of current, $I_{T2}$, and in response provides an output current labeled, $I_{T2D/A}$. The two currents $I_{T2}$ and $I_{T2D/A}$ are then summed to form a summation current, $I_{T2NEW}$. The current $I_{T2NEW}$ is then provided to the positive input of the amplifier 42.

Figure 4:
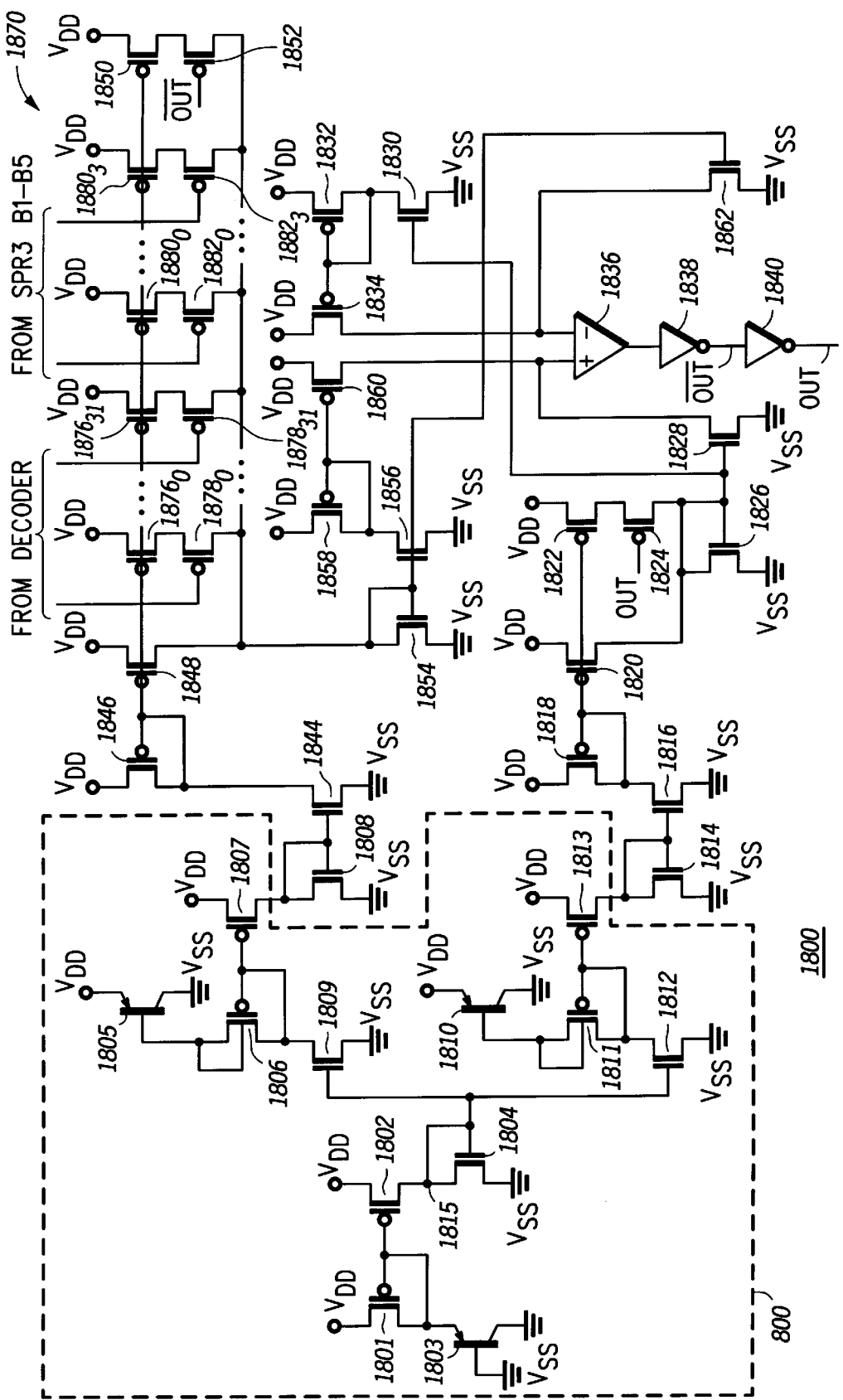
FIG. 4 illustrates, in circuit diagram form, a thermal assist unit of FIG. 1, according to an alternate embodiment of the present invention.

FIG. 4 illustrates, in circuit diagram form, one embodiment of the temperature sensor 35 of FIG. 3. The process compensated current generator unit 37 of FIG. 3 is illustrated as circuits, such as those within temperature dependent current generator 38 of FIG. 3 800 of FIG. 4. Reference current generator 36 is implemented with transistors 1801, 1802 and 1803. The drain nodes of transistors 1801 and 1802 are coupled to the source voltage, VDD, and the gate nodes are coupled to each other. The source node of transistor 1801 is coupled to the emitter node of bipolar transistor 1803. The other nodes of transistor 1803 are coupled to ground reference voltage, VSS. The source node of transistor 1802 is coupled to a first half of a current mirror circuit, transistor 1804. Note that transistor 1804 is a first half of a current mirror circuit, and is coupled to transistors 1809 and 1812, which each forms another half of a current mirror circuit. In this way, a reference current is generated at the source node of transistor 1802, and the reference current is then provided to each of two separate circuits within temperature dependent current generator 38.

A first circuit within temperature current generator 38 of FIG. 3 generates the first current $I_{T2}$, and includes transistors 1805, 1806, and 1807 of FIG. 4. A second circuit within temperature current generator 38 of FIG. 3 generates the second current $I_{T1}$, and includes transistors 1810, 1811, and 1813 of FIG. 4. The current $I_{T2}$ is generated by the source node of transistor 1807, and the current $I_{T1}$ is generated by the source node of transistor 1813. Each of the circuits receives the reference current, $I_{REFERENCE}$, from transistor 1802. The two currents act as a transducer, as the difference of the currents is a predictable function of temperature. With respect to $I_{T1}$ and $I_{T2}$, a voltage difference between the two circuits which generate them can be measured and converted into useful information. Specifically, the two voltages are converted to two currents. One of the currents is then modulated by a digital to analog converter. Finally, the two currents are fed to an analog current comparator. The output of the analog current comparator may be buffered by an inverter, etc.

In order to provide a robust temperature sensor which is consistent over a wide range of processing conditions, the circuit of reference current generator 36 complements the circuits of temperature dependent current generator 38. As illustrated in FIG. 4, processing variations may result in changes in the currents $I_{T1}$ and $I_{T2}$, which then result in inconsistent temperature sensing over the processing window. Specifically, $I_{T2}$ is generated at the source node of transistor 1807. A biasing current, IBIAS1, is generated at the coupling of the drain node of transistor 1809 to the gate nodes of transistors 1806 and 1807. The bias current is generated by a "fighting" condition between transistor 1801 and transistor 1803. The biasing current is to prevent the effects of processing variations and maintain the relationship between the current difference ($I_{T2}-I_{T1}$) and $I_{T2}$. This relationship defines the transducing effect of the temperature dependent current generator. In other words, for a given designed circuit, processing changes and variations should not affect the currents IT1 and IT2 in any way that violates the relationship:

$$\Delta I/I_{T2}; \text{ where } \Delta I=I_{T2}-I_{T1} \text{ and}$$

where the relationship defines the predictable conversion of changes in current to changes in temperature. This is important, as operation of the current comparator 40, which includes the current digital to analog converter 44, is based on the absolute value of the current $I_{T2}$ and also on the difference in the currents $I_{T1}$ and $I_{T2}$. The size of current comparator 40 is proportional to the ratio $\Delta I$ to $I_{T2}$. Further the operation of a temperature sensor is to measure the die junction temperature and control data processing performance and thus extend the useful life of a semiconductor device. The temperature sensor will often limit the code executed by the processor and thus prevent the processor from implementing certain functions at the higher temperature. Therefore, the predictability of temperature sensing is often critical to the design and operation of a data processing system.

A problem exists in trying to solve a numerical derivation of the behavior of the temperature dependent current generator 38, since the biasing current is determined by the fight condition between a PFET device and a bipolar device. The PFET device has a current definition which includes the square of the source to gate voltage. The PNP device has a current definition which includes an exponential of the emitter to base voltage. The relationship is more easily described by a qualitative analysis of the behavior of the circuit, as the currents $I_{T1}$ and $I_{T2}$ are generated by PFET devices 1813 and 1807. The gate voltages are proportional to $V_{eb}$, the emitter-to-base voltage of bipolar devices 1810 and 1805, and $V_{LS}$, the level shifting voltage or gate-to-source voltage of level shifting PFET devices 1811 and 1806.

The current $I_{T1}$ is proportional to various processing parameters and voltage levels, including thickness of the oxide, mobility, transistor threshold voltage, transistor gate-to-source voltage, etc. Therefore, changes in these variables have a resultant effects on the current $I_{T1}$. The change in $I_{T1}$ reflects the change in temperature and is used to determine the temperature of the system, therefore variables which affect the $I_{T1}$ may alter the performance of the sensor. It is desired that the sensor perform consistently over the entire processing window. The present invention provides a method of controlling $I_{T1}$, which results in sensor performance having a best case error which is equal and opposite to the worst case error. The sensor thus performs with predictable measurement error over the processing window, and compensates to maintain the error within a predetermined allowance.

Note that a sensor's performance reflects the correspondence between the predicted temperature and the actual temperature. A processing window includes at least one best case and at least one worst case with respect to transistor performance. Typically, the sensor will be produced at some point in between the best and worst and case. In operation, there is often a measurement error between the sensor produced under worst case conditions and the one produced under best case conditions. The present invention provides a method of maintaining the measurement error within a certain range for all processing conditions.

According to one embodiment of the present invention, illustrated in FIG. 4, the current generator is sized to oppose the natural tendency of $I_{T1}$ to increase or decrease by settling at an operating point that balances the current error over the processing window until the error is equally distributed around a nominal operating point. In this circuit there is the added complexity of having distinct best case and worst case conditions for both PFET and bipolar transistors. In one example, a sensor is processed at the best case condition for PFET and the worst case condition for bipolar transistors. The bias current between transistors 1801 and 1803 is effectively reduced by these conditions. The bipolar transistor 1803 forces a reduction of the gate-to-source voltage of transistor 1801 as the worst case bipolar condition requires higher emitter-to-base voltage for operation. This in turn reduces the gate-to-source voltage of transistor 1801 resulting in the smaller bias current. This in turn reduces the gate-to-source voltage of transistors 1807 and 1813 resulting in reduced currents $I_{T1}$ and $I_{T2}$, thus compensating for the increased strength of these transistors due to the best case processing.

A second current electrode of transistor 1813 is coupled to a first current electrode and to a control electrode of an n-type transistor 1814 and to a control electrode of an n-type transistor 1816. A second current electrode of transistor 1814 is coupled to the second voltage supply, $V_{SS}$. A first current electrode of transistor 1816 is coupled to a first current electrode and to a control electrode of a p-type transistor 1818. A second current electrode of transistor 1816 receives the second voltage supply, $V_{SS}$. A second current electrode of transistor 1818 receives the first voltage supply, $V_{DD}$. The control electrode of transistor 1818 is coupled to a control electrode of each of two p-type transistors 1820 and 1822. A first current electrode of each of transistors 1820 and 1822 receive the first voltage supply, $V_{DD}$. A second current electrode of transistor 1822 is connected to a first current electrode of a p-type transistor 1824. A control electrode and a second current electrode of transistor 1824 receives a final output signal OUT and is connected to a first current electrode of an n-type transistor 1826, respectively. A second current electrode of transistor 1820 is also connected to the first current electrode of transistor 1826. The first current electrode of transistor 1826 is coupled to its control electrode and to a control electrode of each of two n-type transistors 1828 and 1830. A second current electrode of each of transistors 1826, 1828, and 1830 receives the second voltage supply, $V_{SS}$.

A first current electrode of transistor 1828 is connected to a positive (+) terminal of a voltage gain stage 1836. A first current electrode of transistor 1830 is connected to a first current electrode and a control electrode of a p-type transistor 1832 and to a control electrode of a p-type transistor 1834. A first current electrode of transistor 1834 is coupled to a negative (−) terminal of voltage gain stage 1836. A second current electrode of each of transistors 1832 and 1834 receives the first voltage supply, $V_{DD}$.

An output operational amplifier is buffered by two serially connected inverters 1838 and 1840. An output of inverter 1838 generates an intermediate output signal $\overline{OUT}$. An output of inverter 1840 generates a final output signal OUT.

The control electrode of transistor 1808 is coupled to a control electrode of an n-type transistor 1844 and to a second electrode of transistor 1808. A second terminal of diode 1808 receives the second voltage supply, $V_{SS}$. A first current electrode of transistor 1844 is coupled to a first current electrode and to a control electrode of a p-type transistor 1846. A second current electrode of transistor 1844 receives the second voltage supply, $V_{SS}$. A second current electrode of transistor 1846 receives the first voltage supply, $V_{DD}$. The control electrode of transistor 1846 is coupled to a control electrode of each of two p-type transistors 1848 and 1850. A first current electrode of each of transistors 1848 and 1850 receives the first voltage supply, $V_{DD}$. A second current electrode of transistor 1850 is connected to a first current electrode of a p-type transistor 1852. A control electrode and a second current electrode of transistor 1852 receives the intermediate output signal $\overline{OUT}$ and are connected to a first current electrode of an n-type transistor 1854, respectively. A second current electrode of transistor 1848 is also connected to the first current electrode of transistor 1854. The first current electrode of transistor 1854 is coupled to its control electrode and to a control electrode of an n-type transistor 1856. A second current electrode of transistor 1854 and a first current electrode of transistor 1856 receive the second voltage supply, $V_{SS}$.

A second current electrode of transistor 1856 is connected to a first current electrode and to a control electrode of a p-type transistor 1858. A second current electrode of transistor 1858 receives the first voltage supply, $V_{DD}$. The control electrode of transistor 1858 is also connected to a control electrode of a p-type transistor 1860. A first current electrode and a second electrode of transistor 1860 receive the first voltage supply, $V_{DD}$ and are connected to the positive (+) terminal of voltage gain stage 1836, respectively. A first current electrode, a second electrode, and a control electrode of a transistor 1862 are connected to the negative (−) terminal of voltage gain stage 1836, receives the second voltage supply, $V_{SS}$, and are connected to the control electrode of transistor 1856, respectively.

As described above in connection with FIG. 2, temperature sensor 314 contains a digital to analog converter 316. Digital to analog converter 1870 comprises a sensing portion and a calibrating portion. The sensing portion is used to modulate the current indirectly output by transistor 1807. When this output is equal to the current indirectly output by transistor 1813, then the temperature of the thermal sensor can be determined. The calibrating portion is used to supply a fixed current to transistor 1854 to compensate for the variations caused by the process used to manufacture data processor 10.

Continuing with the sensing portion, 32 pairs of p-type transistors are connected in series between the supply voltage, $V_{DD}$, and the first current electrode of transistor 1854. In particular, a first current electrode, a control electrode, and a second current electrode of a p-type transistor 1876$_i$ are connected to the supply voltage $V_{DD}$, to the control electrode of transistor 1846, and to a first current electrode of a transistor 1878$_i$, respectively, where i is an integer index ranging from 0 to 31. A control electrode and a second current electrode of transistor 1878$_i$ are connected to receive the ith output of decoder 312 and to the current electrode of transistor 1854, respectively. In the preferred embodiment, there are 32 individual switches in the sensing portion. The number may be varied to suit the particular application and the desired resolution of the application in which temperature sensor 1800 is incorporated.

Continuing with the calibrating portion, four pairs of p-type transistors are connected in series between the supply voltage, $V_{DD}$, and the first current electrode of transistor 1854. In particular, a first current electrode, a control electrode, and a second current electrode of a p-type transistor 1880$_j$ are connected to the supply voltage $V_{DD}$, to the control electrode of transistor 1846, and to a first current electrode of a transistor 1882$j$, respectively, where is an integer index ranging from 0 to 3. A control electrode and a second current electrode of transistor 1882$_j$ are connected to receive a jth one of the calibrating bits and to the first current electrode of transistor 1854, respectively. The number may be varied to suit the particular application and the desired resolution of the application in which temperature sensor 1800 is incorporated.

Reference current generator 36 generates a current at node 1815 that is mirrored by transistor 1804 to transistors 1809 and 1812. This current produces a current through each of these two transistors, and in turn creates the voltages $V_{eb}$, the emitter-base voltage, and $V_{LS}$, the level shifting voltage which in turn create the current $I_{T2}$ between transistors 1807 and 1808, and the current $I_{T1}$ between transistors 1813 and 1814. The difference between the currents $I_{T1}$ and $I_{T2}$ provides a measure which is a predictable function of junction temperature.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 10. It is to be understood therefore, that the invention encompasses all such modifications that do not depart from the spirit and scope of the invention as defined in the appended claims.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A current generator in an integrated circuit, comprising:

means for generating a process compensation indicator, where the process compensation indicator is a function of at least one semiconductor device parameter of the integrated circuit;

means for generating a biasing voltage, comprising at least one transistor;

compensation means for adjusting the biasing voltage according to the process compensation indicator, the compensation means coupled between the means for generating a biasing voltage and the means for generating the process compensation indicator; and means for transforming the biasing voltage into a current in response to the means for adjusting the biasing voltage;

wherein the transistor is a bipolar semiconductor device; and wherein the means for generating a biasing voltage further comprises a level shifting device.

2. The current generator according to claim 1, wherein the process compensation indicator is a current.

3. The current generator according to claim 1, wherein the at least one semiconductor device parameter is threshold voltage.

4. The current generator according to claim 1, wherein the at least one semiconductor device parameter is oxide thickness.

5. A current generator in an integrated circuit, comprising:

means for generating a process compensation indicator, where the process compensation indicator is a function of at least one semiconductor device parameter of the integrated circuit;

means for generating a biasing voltage, comprising at least one transistor;

compensation means for adjusting the biasing voltage according to the process compensation indicator the compensation means coupled between the means for generating a biasing voltage and the means for generating the process compensation indicator; and means for transforming the biasing voltage into a current in response to the means for adjusting the biasing voltage; wherein the means for generating the process compensation indicator further comprises at least one bipolar semiconductor device and at least one transistor, wherein a first node of the least one bipolar semiconductor device is coupled to a first node and a gate node of the at least one transistor.

* * * * *